United States Patent
Golshan

(10) Patent No.: US 7,554,707 B1
(45) Date of Patent: Jun. 30, 2009

(54) METHOD AND APPARATUS FOR OPTICAL PROCESSING

(75) Inventor: Khosrow Golshan, Laguna Beach, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/630,883

(22) Filed: Aug. 2, 2000

(51) Int. Cl.
*G02F 3/00* (2006.01)
*G02B 6/00* (2006.01)

(52) U.S. Cl. .................. 359/108; 359/107; 385/122

(58) Field of Classification Search .............. 359/107, 359/108, 577; 250/214; 385/3, 24, 45, 5, 385/16, 15, 122; 257/23, 24
See application file for complete search history.

(56) References Cited

U.S. PATENT DOCUMENTS

| | | | | |
|---|---|---|---|---|
| 3,837,728 A | * | 9/1974 | Logan et al. ............ | 385/8 |
| 4,128,300 A | * | 12/1978 | Stotts et al. ............ | 385/15 |
| 5,233,205 A | * | 8/1993 | Usagawa et al. ........ | 257/23 |
| 5,239,173 A | * | 8/1993 | Yang ..................... | 250/214 |
| 5,315,422 A | * | 5/1994 | Utaka et al. ............ | 359/107 |
| 5,754,714 A | * | 5/1998 | Suzuki et al. .......... | 385/5 |

* cited by examiner

Primary Examiner—Audrey Y Chang
(74) Attorney, Agent, or Firm—Foley & Lardner LLP

(57) ABSTRACT

An optical logic circuit is disclosed. The optical logic circuit is configured on a substrate of a first material. The optical logic circuit also has an optical layer which overlays the substrate layer and is at least partially configured of a second material. The optical layer is patterned to provide a plurality of optical pathways. At least one of the optical pathways transmits an optical bias and at least one optical pathway is configured to provide an optical input and at least one optical pathway is configured to provide an optical output. The optical pathways are configured to provide a Boolean logic output based on the at least one optical input.

32 Claims, 6 Drawing Sheets

US 7,554,707 B1

METHOD AND APPARATUS FOR OPTICAL PROCESSING

FIELD OF THE INVENTION

The invention relates to optical computing devices. In particular, the invention relates to hardware implementations of optical computing logic gates. The optical logic gates are configured to be used in optical processing devices.

BACKGROUND OF THE INVENTION

Optical processors function based on the action of photons in an optical circuit. The use of optical processors provide faster computation times and immunity from electromagnetic interference when compared to conventional electronic processors. However, practical implementations of optical processors have not been realized. Optical processing devices have heretofore not been miniaturized, easily mass produced, made reliable and designed to consume low power. Further, optical processing devices have not been shown to be integratable on a single substrate or to have the ability to interface with electronic systems with ease. These difficulties are due to the fact that internal representations, realizations, and implementations of logic and arithmetic units utilizing interference characteristics, interconnections, and architectures have not been realized.

Accordingly, there is a need for optical processors that may be formed on a substrate in a miniaturized form. Further, there is a need for optical processors that utilize the interference properties of light to form logic gates. Further still, there is a need for optical processors that are easily manufactured. Yet further still, there is a need for optical processors that are easily interfaced with conventional electronic devices. Yet further still, there is a need for optical processors that outperform conventional electronic processors. Yet further still, there is a need for optical processors that are reliable and designed to consume low power.

SUMMARY OF THE INVENTION

An exemplary embodiment relates to an optical logic circuit. The optical logic circuit includes a substrate comprising a first material. The optical logic circuit comprises an optical layer overlaying the substrate at least partially comprising a second material. The optical layer is patterned to provide a plurality of optical pathways. At least one of the optical pathways is configured to transmit an optical bias. At least one of the optical pathways is configured to provide an optical input. At least one of the optical pathways is configured to provide an optical output. The optical pathways are configured to provide a Boolean logic output based on the at least one optical input.

Another exemplary embodiment relates to an optical logic gate for an optical processor. The optical logic gate includes a substrate configured of a first material. The optical logic gate also includes a patterned optical layer overlaying the substrate at least partially configured of a second material. The patterned optical layer provides a plurality of optical conduits of the second material, at least one of the optical conduits is configured to receive an optical input and at least one of the optical conduits is configured to provide an optical output. The optical conduits are configured to provide a Boolean logic output based on the at least one optical input.

Yet another exemplary embodiment relates to a method of creating at least one optical logic gate. The method includes providing a substrate of a first material. The method also includes providing a second material overlying the first material. The method further includes patterning the second material by removing at least some of the second material. The method still further includes providing a third material overlying at least the substrate.

Yet still another exemplary embodiment relates to a method of providing a Boolean logic optical output based on at least one optical input. The method includes providing light to the at least one optical input. The method also includes providing a plurality of optical pathways. Further, the method includes providing a light bias. Further still, the method includes providing an optical output, the optical output is based on the at least one input and is representative of a Boolean logic function.

Yet still another exemplary embodiment relates to an optical logic circuit. The optical logic circuit includes a substrate comprising a first material. The optical logic circuit also includes an optical layer overlaying the substrate at least partially comprising a second material. The optical layer is patterned to provide a plurality of optical pathways. At least one optical pathway is configured to provide an optical input, and at least one optical pathway is configured to provide an optical output. The optical pathways are configured to provide a Boolean logic output based on the at least one optical input.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
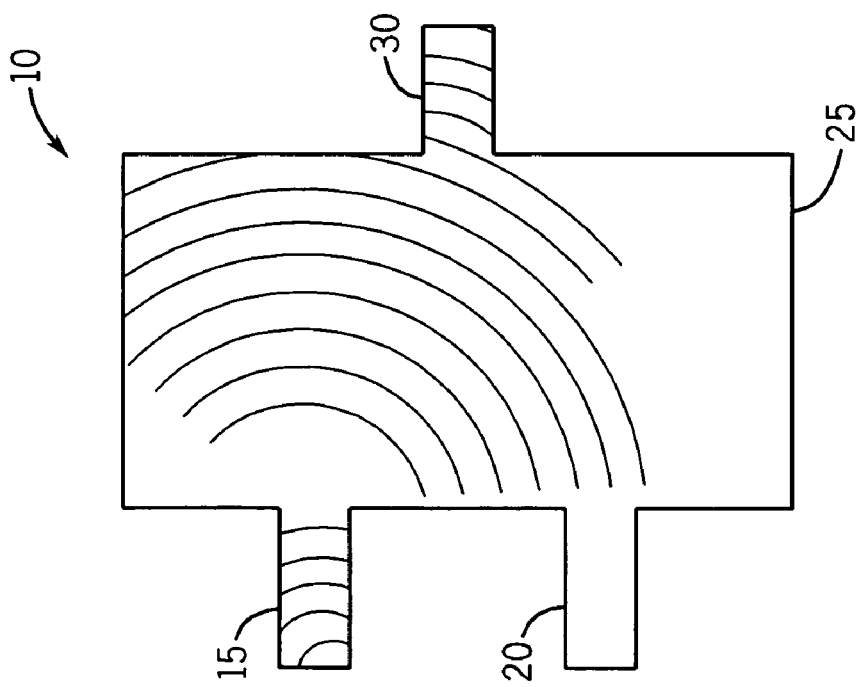
FIG. 1 is an illustrative representation of an optical NOT (inverter) gate.

Referring now to FIG. 1, an exemplary embodiment of a NOT (inverter) gate 10 is depicted. Inverter gate 10 is a material patterned on a substrate, such as, but not limited to, a doped silicon or doped gallium arsenide material. Inverter gate 10 includes an optical bias input 15, optical bias input 15 configured to receive a constant light input or light bias (hereinafter, references made to light include any wavelength of electromagnetic radiation, including, but not limited to electromagnetic radiation in the visible spectrum). Inverter gate 10 further includes a second optical input 20 which selectively receives a light input. Further still, inverter gate 10 includes an interference region 25 in which light coming from inputs 15 and 20 is received. Inverter gate 10 also includes an optical output 30 that receives the optical output generated by interference region 25 based on inputs 15 and 20.

As depicted in FIG. 1, a bias light input is constantly received by bias light input 15. In the situation of FIG. 1, input 20 is dark, in other words, input 20 does not receive any light input. Interference region 25 thus receives incoming light from bias input 15. Because no other light enters interference region 25, the light is provided through output 30, virtually undisturbed.

Figure 2:
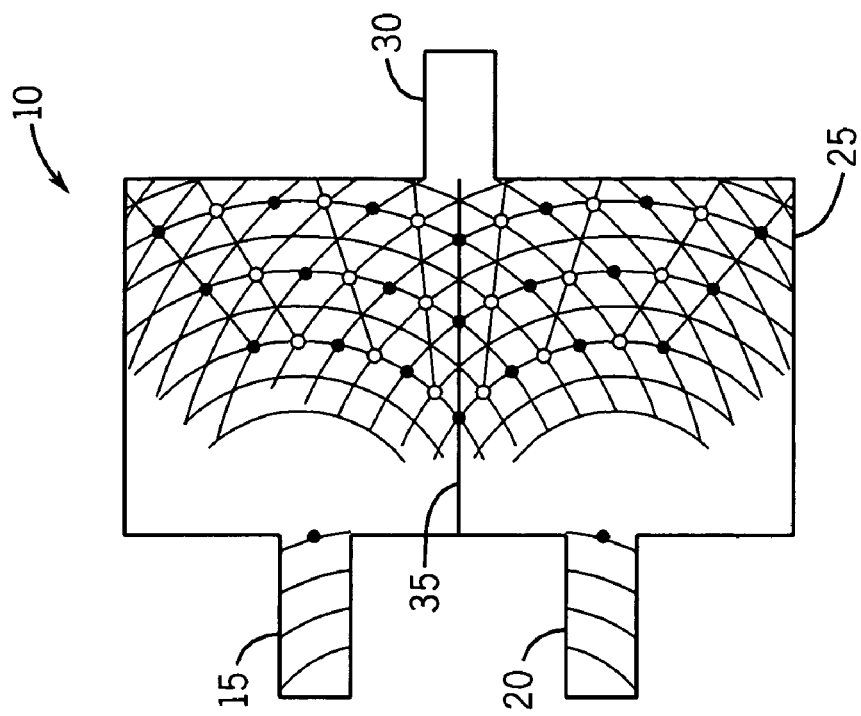
FIG. 2 is an illustrative representation of the optical NOT (inverter) gate of FIG. 1.
Figure 9:
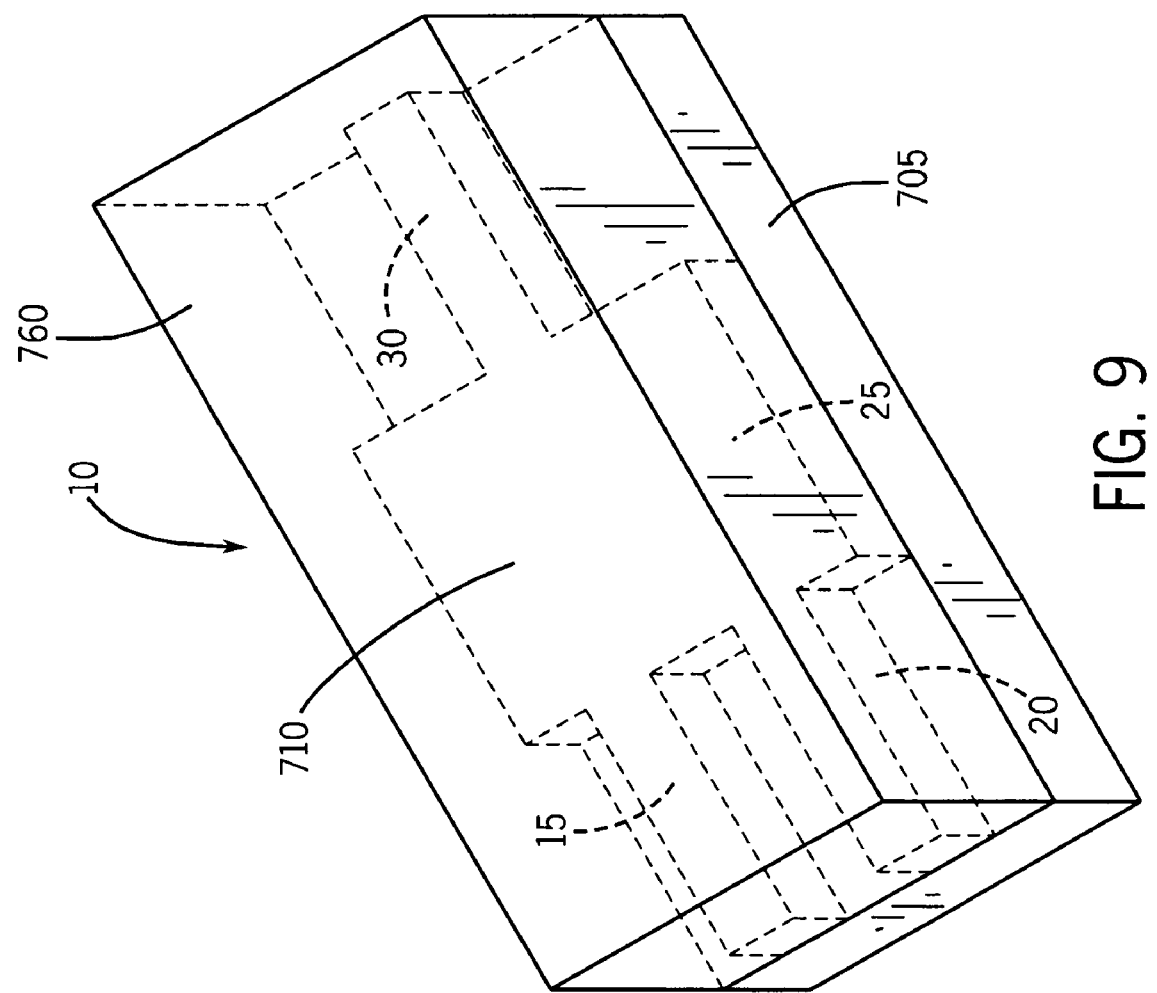
FIG. 9 is an illustrative representation of the optical NOT gate of FIG. 2 formed on a substrate as depicted in FIG. 8.

As depicted in FIG. 2 and FIG. 9, light may be provided to input 20 simultaneous with the bias light provided to bias input 15. Light from bias input 15 and input 20 are received in interference region 25. Light waves in interference region 25 destructively interfere, in particular, along line 36 which is substantially aligned with output 30. Therefore, output 30 provides a substantially dark output, in other words, the energy of the light coming from interference region 25 is low, i.e., below a predetermined threshold.

The NOT gate depicted in FIGS. 1 and 2 performs a basic logic function normally called inversion or complementation, and is commonly referred to as an inverter. The purpose of the optical inverter is to convert or change one logic level to another logic level in terms of light. If a light is applied to its input, a dark will appear on its output. If a dark is applied to its input, a light will appear on its output. The operation of the inverter is summarized with Table I, which shows the output for each possible input.

TABLE I

Truth Table for inverter.

| Bias | Input | Output |
|---|---|---|
| Light | Light | Dark |
| Light | Dark | Light |

Figure 7:
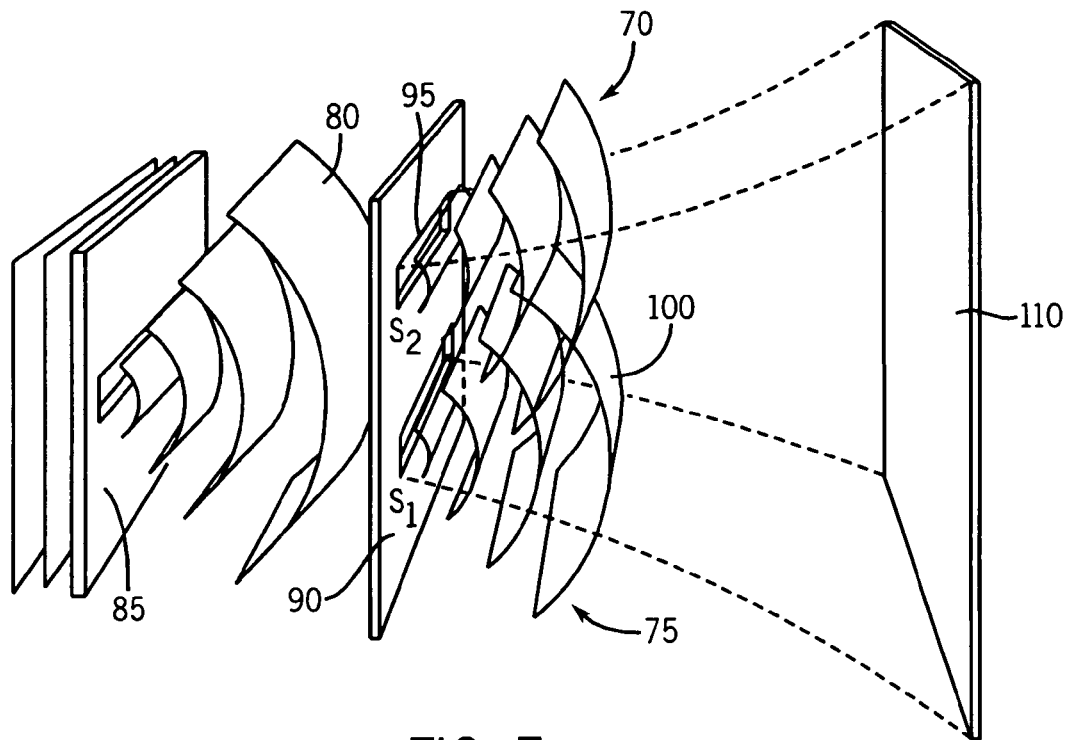
FIG. 7 is an illustrative representation of the cancellation of light due to constructive interference of wavefronts; d2

The optical interference caused in interference region 25 is further depicted in FIG. 7. The optical interference may be termed an interaction of two or more light waves 70 and 75 yielding a resultant irradiance which deviates from the sum of the component irradiance. FIG. 7 depicts the action of wavefront splitting, which is one building block in optical realization of Boolean operators as used in the exemplary embodiments. As depicted in FIG. 7, light waves 80 coming from a source 85 are received by a slit $S_1$ 90 and slit $S_2$ 95. Wavefronts 70 and 75 coming from slits 90 and 95 interfere at points, such as, but not limited to, point 100, thereby causing destructive interference which may be observed as interference fringes if the light is projected onto a plain screen, such as screen 110. Using, an expression associated with (Young's experiment, one of ordinary skill in the art may calculate the approximate position of interference fringes on screen 110. Similarly, as applied to interference region 25, as depicted in FIGS. 1 and 2, one of ordinary skill in the art may calculate the location of output 30, such that output 30 is substantially aligned with an interference line such as line 35 (FIG. 2).

Figure 3:
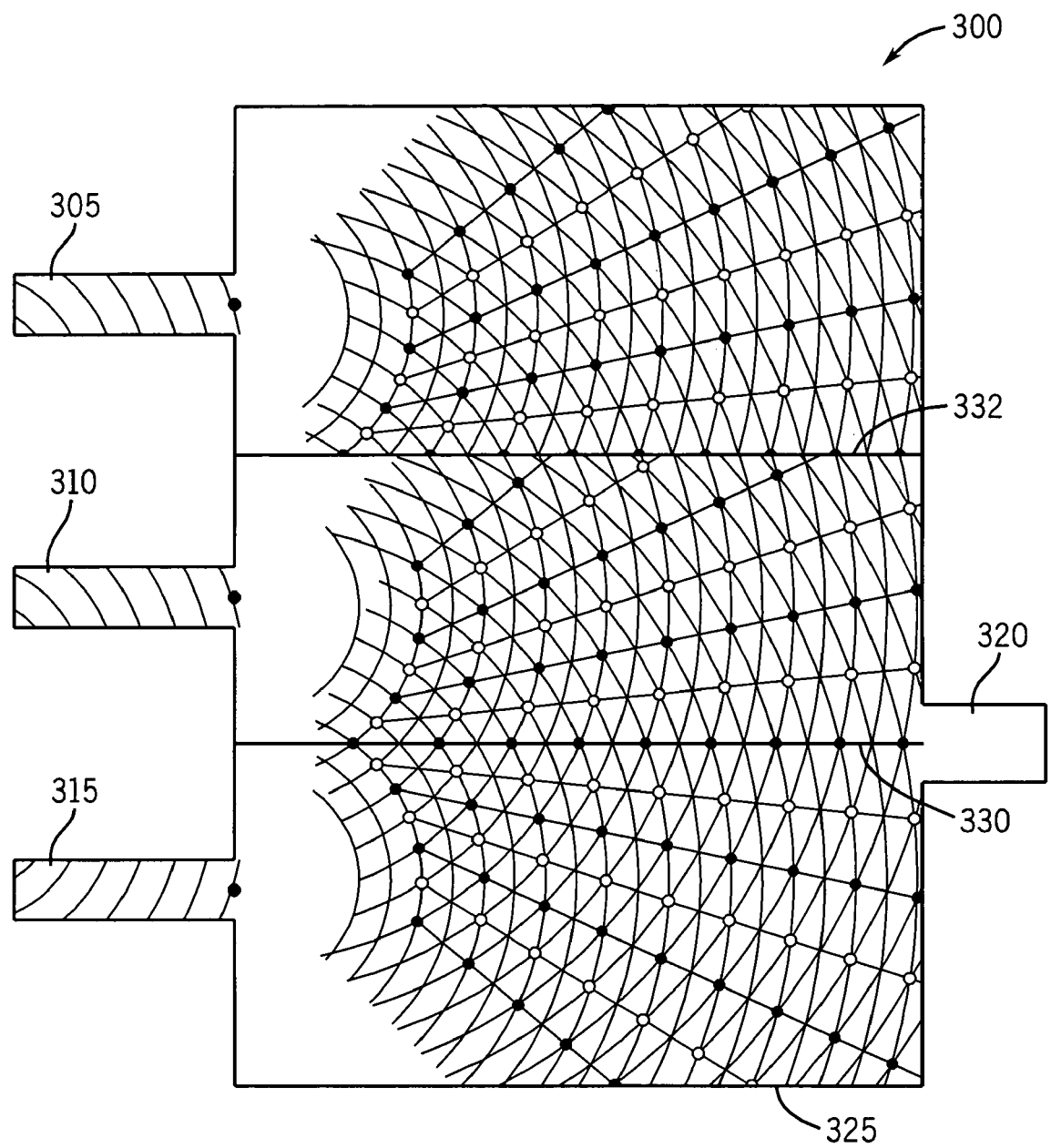
FIG. 3 is an illustrative representation of an optical NAND gate.

Referring now to FIG. 3, the construction of an optical NAND gate is depicted. Similar to the NOT gate of FIGS. 1 and 2, NAND gate 300 of FIG. 3 may be constructed of a material patterned on a substrate. NAND gate 300 includes a bias input 305, a/selective input A 310 and a selective input B 315. NAND gate 300 further includes output 320 optically coupled to inputs 305, 310, 315, and output 320 via an interference region 325.

The NAND gate 300 is a "universal" function, that is, it can be used, alone or in combination with other NAND gates or logic gates, to construct an AND gate, an OR gate, an inverter (NOT gate), or any combination of these functions. The logic operation of optical NAND gate 300 is such that a dark output occurs only if all inputs are lighted. If any of the inputs are dark, the output will be dark.

The operation of two-input NAND gate 300 is summarized with Table II, which shows the output for each possible input combination.

TABLE II

Truth Table for Two-Input NAND.

| Bias | InputA | InputB | Output |
|---|---|---|---|
| Light | Light | Light | Dark |
| Light | Light | Dark | Light |
| Light | Dark | Light | Light |
| Light | Dark | Dark | Light |

FIG. 3 depicts a basic operation of optical NAND gate 300. In the state depicted in FIG. 3, both input A 310 and input B 315 are lighted. The wavefront interference occurs along line 330, which is in alignment with output 320. Therefore, there will be substantially little energy (light) output (i.e., the output will be dark). In an alternative state, if any of the input terminals are dark, then output terminal 320 will be light. FIG. 3 also shows a second wavefront interference line 332. Output 320 could alternatively be aligned with second wavefront interference line 332.

Figure 4:
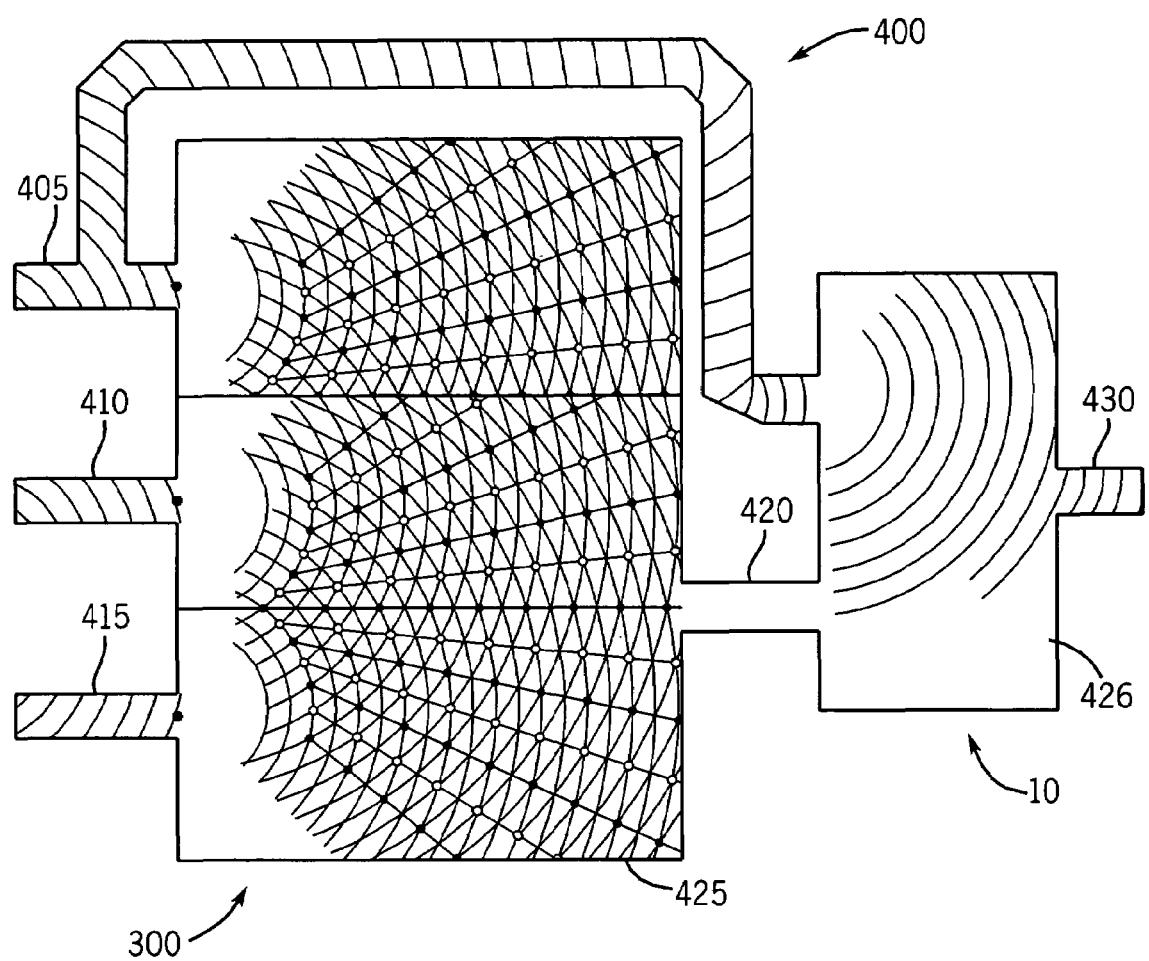
FIG. 4 is an illustrative representation of an optical AND gate.

Referring now to FIG. 4, an exemplary embodiment of an AND gate 400 is depicted. AND gate 400 is constructed from a NAND gate 300 and a NOT gate 10 coupled to one another. An input 20 of NOT gate 10 is optically coupled to an output 320 of NAND gate 300. A bias light input 15 of NOT gate 10 is optically coupled to a bias light input 305 of NAND gate 300. AND gate 400 or NAND gate 300 and NOT gate 10 together perform the basic operation of logic multiplication commonly known as the AND function. AND gate 400 comprises two or more inputs 410 and 415, and a single output 430.

In operation, optical AND gate 400 is configured such that output 430 is light when both inputs 410 and 415 are light. If either of inputs 410 and 415 are dark the output 430 is dark. The operation of two-input AND gate 400 is summarized in Table III, which shows the output 430 for each possible input 410 and 415 combination.

TABLE III

Truth Table for Two-Input AND.

| Bias | InputA | InputB | Output |
|---|---|---|---|
| Light | Light | Light | Light |
| Light | Light | Dark | Dark |
| Light | Dark | Light | Dark |
| Light | Dark | Dark | Dark |

For proper operation, AND gate 400 is configured with a light bias 405 that is transmitted to NAND gate interference region 425 and NOT gate interference region 426.

Figure 5:
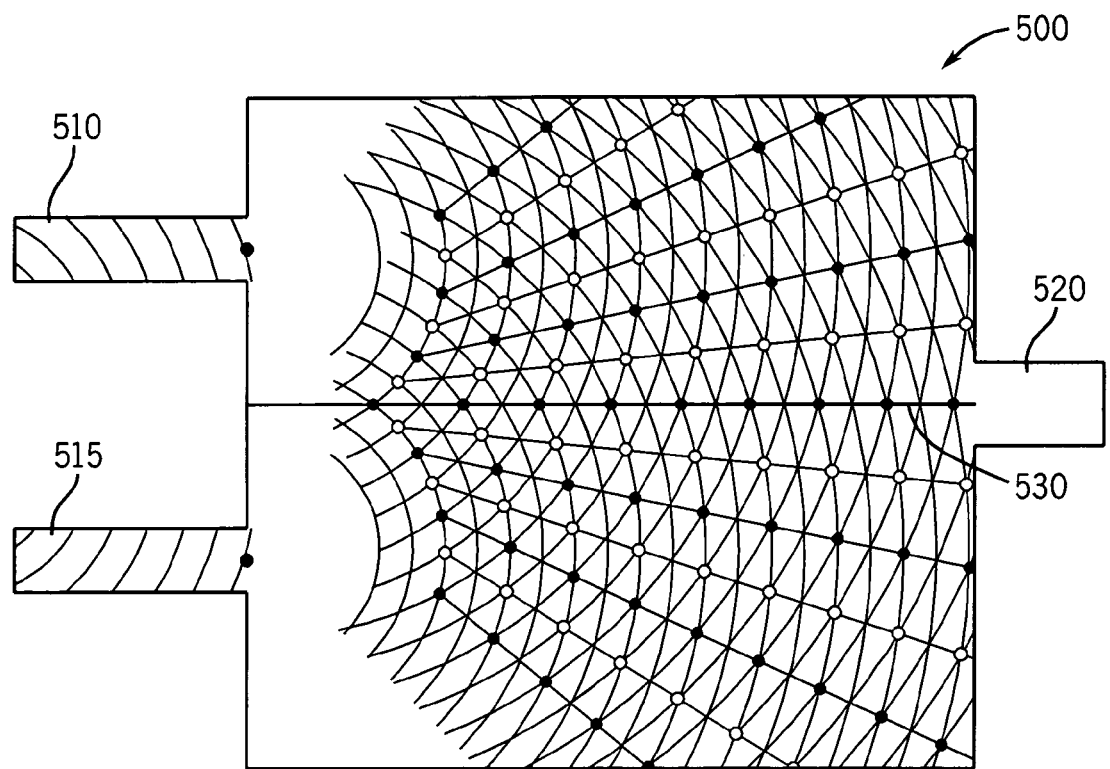
FIG. 5 is an illustrative representation of an optical exclusive OR (XOR) gate.

Referring now to FIG. 5, an exemplary embodiment of an exclusive OR (XOR) gate is depicted. Exclusive OR (XOR) gate 500 includes input A 510 and input B 515. Exclusive OR (XOR) gate 500 also includes an output 520 and an interference region 525 coupled between inputs 510 and 515 and output 520. In the state depicted in FIG. 5, a light input is transmitted through input A and input B causing interference along line 530. The interference caused along line 530 provides a substantially dark output 520. It should be noted that the XOR function does not require an optical bias input.

The operation of XOR gate 500 is summarized with Table IV, which shows the output for each possible input combination.

TABLE IV

Truth Table for Inverter.

| Input A | Input B | Output |
|---------|---------|--------|
| Light | Light | Dark |
| Light | Dark | Light |
| Dark | Light | Light |
| Dark | Dark | Dark |

Figure 6:
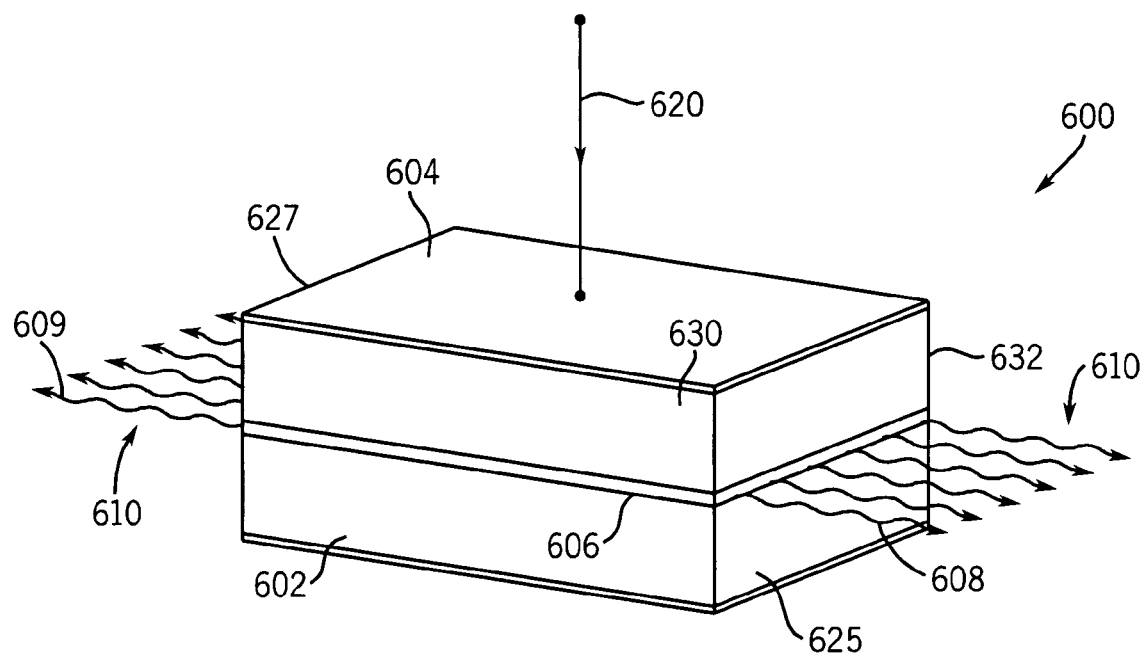
FIG. 6 is an illustrative representation of a semiconductor laser.

As depicted in FIG. 6, a semiconductor laser 600 is illustrated. Laser diodes, such as laser diode 600 may be used as a source of electromagnetic radiation or light for the optical gates as described above. Semiconductor lasers are one of many possible input interfaces to optical computing devices (in contrast, any of a variety of electromagnetic detectors may be used as output interfaces to optical computing devices). Semiconductor lasers, such as semiconductor laser 600 rely on the electroluminescence phenomenon. The electroluminescence phenomenon is the generation of light 610 by an electric field current 620 passing through a material under an applied electric field. Electroluminescent light differs from thermal radiation or incandescence in the relatively narrow range of wavelengths contained within its spectrum (for example, for a typical LED, the spectral line width is typically 100 to 150 angstroms). Further, the light may be nearly perfectly monochromatic, as in the laser diode (0.1 to 1 angstrom). Semiconductor lasers and LEDs are based on the interaction between electron and photon in a matter. Semiconductor lasers are similar to other lasers (such as the solid-state ruby laser and helium-neo gas laser) in that the emitted radiation has spatial and temporal coherence. The list of semiconductor materials that have exhibited laser action continue to grow. Table V shows the range of laser emission wavelengths for various semiconductors from near ultraviolet to far infrared. Two exemplary materials are $Al_xGa_{1-x}As_ySb_{1-y}$ and $Ga_xIn_{1-x}As_yP_{1-y}$.

A plurality of materials may be used for semiconductor lasers, including gallium arsenide and silicon materials, among many others, as provided in Table V, which is exemplary of a plurality of materials suitable for semiconductor lasers. Further, Table V illustrates corresponding emission wavelengths for each material.

TABLE V

Semiconductor Laser Materials.

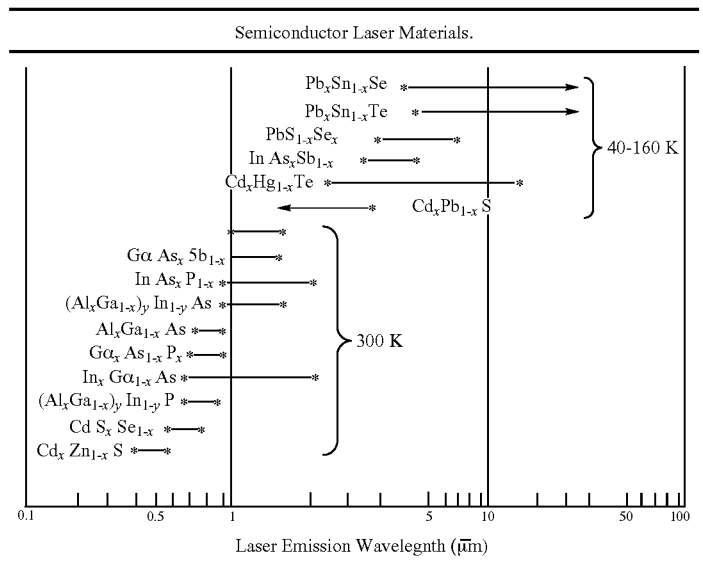

The semiconductor laser 600 of FIG. 6 shows the basic structure of a p-n junction. A pair of parallel planes 625 and 627 are cleaved or polished perpendicular to the plain of the junction. The two remaining sides 630 and 632 of diode 600 are roughened to eliminate lazing in directions other than the main direction. Diode structure 600 is called a fabry-perot cavity. As current flowing through the p-n junction is increased, radiation 610 is emitted in the main direction 608 and 609 thereby providing lazing action.

Figure 8:
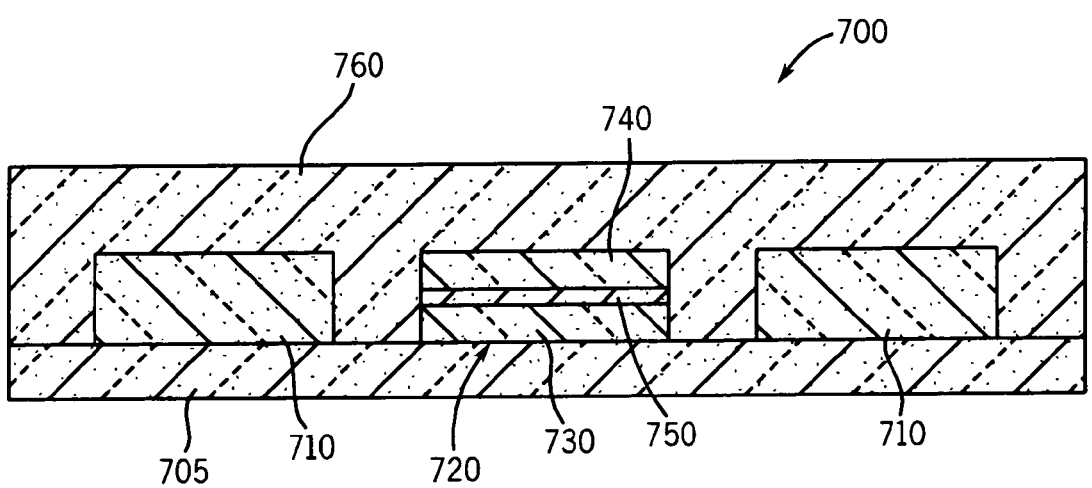
FIG. 8 is an illustrative representation of a cross section of an optical processing device.

Therefore, it is possible to construct an optical processing device having a plurality of light sources, such as lasers 600. Further, a plurality of optical gates, forming an optical processor 700, may be formed on a substrate 705, as depicted in FIG. 8 and FIG. 9. Substrate 705 (e.g., silicon, gallium arsenide, etc.) may be overlaid with a second material 710 (e.g., doped silicon, doped gallium arsenide, other nondoped materials, etc.) forming a plurality of gates patterned in second material 710. Further, the device may include a plurality of laser light sources 720 having a first layer 730 (e.g., semiconductor) overlaid with a second layer 740 (e.g., semiconductor) and having a doped junction 750 therebetween. In an exemplary embodiment, optical processor 700 may include a non-translucent layer 760 overlaying substrate 705 and patterned gate structures 710 and semiconductor laser 720, and any other devices formed on substrate 705.

In an exemplary embodiment, a plurality of techniques often applied to forming conventional electrical semiconducting devices may be used to form optical processing devices, such as optical processor 700. For example, optical processor 700 may be formed on a silicon substrate 705. Methods used for doping and conventional semiconductor integrated circuit devices may be used to dope layer 710. Further, layer 710 may be patterned by a number of conventional techniques, including, but not limited to, photoresist techniques and etching techniques. Similarly, the formation of semiconductor laser 720 may be provided using similar techniques. Further still, a number of deposition techniques may be used to overlay layers of materials, such as material 710 and material 760 which may be done using techniques, including, but not limited to, chemical vapor deposition (CVD) techniques, and sputtering techniques. Although integrated circuit forming techniques may be utilized in forming optical processor 700, any of a variety of other techniques to form optical processor 700 may be used.

While the exemplary embodiments refer to optical processors for optical computing, the exemplary embodiments may also be applied to any of a variety of devices using optical logic gates. Further, while the exemplary embodiments refer to specific material being used, the embodiments are to be interpreted broadly. The embodiment may encompass those situations in which any of a variety of materials is used to produce the optical processing devices.

Further still, those who have skill in the art will recognize that the exemplary embodiments are applicable with many different hardware configurations, software architectures, light sources, and organizations or processes.

While the detailed drawings, specific examples, and particular formulations given describe exemplary embodiments, they serve the purpose of illustration only. The materials and configurations shown and described may differ depending on the chosen performance characteristics and physical characteristics of the optical processors. For example, the type of materials or wavelength of light used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An optical logic circuit performing an inversion function, comprising:
    a semiconductor substrate comprising a first semiconductor material;
    a first semiconductor light source formed on the semiconductor substrate using integrated circuit processing techniques;
    a second semiconductor light source formed on the semiconductor substrate using integrated circuit processing techniques;
    an optical layer overlaying the semiconductor substrate, the optical layer comprising a second semiconductor material, the optical layer configured to provide a plurality of optical pathways, wherein the pathways are formed using integrated circuit processing techniques, the optical pathways forming an optical logic gate, the optical logic gate having a first optical input coupled to the first semiconductor light source formed on the same semiconductor substrate and configured to receive a first light input signal directly from the first semiconductor light source, a second optical input coupled to the second semiconductor light source formed on the same semiconductor substrate and configured to receive a second light input signal directly from the second semiconductor light source, wherein the first light input signal is a constant coherent signal and the second light input signal is a coherent signal which can be selectively turned on and off, an interference region coupled to the first and second optical inputs and configured to receive the first light input signal from the first optical input and the second light input signal from the second optical input, and an optical output coupled to the interference region opposite the first and second optical inputs;
    the interference region comprises the second semiconductor material and is bounded on all sides by semiconductor material other than the second semiconductor material except where the first and second optical inputs and optical output are located, wherein the interference region is a uniform three dimensional region and contains no potential barriers partitioning the interference region between the first and second optical inputs and the optical output, the first and second optical inputs are spaced apart and the optical output is positioned along a chosen line, along which maximum destructive interference occurs when the second light input signal at the second optical input is on, the maximum destructive interference being caused exclusively by the interaction between first and second light input signals, wherein an output light signal is a Boolean logic output signal based on the second light input signal, the output light signal exits the interference region at the optical output, the output light signal having one of two intensities, either a substantially on or a substantially off intensity.

2. The optical logic circuit of claim 1, wherein the interference region is configured to cause substantial cancellation of light exiting the interference region through the optical output when the second light input to the second optical input is turned on.

3. The optical logic circuit of claim 1, further comprising a third semiconductor light source formed on the semiconductor substrate, wherein the interference region includes a third optical input coupled to the third semiconductor light source formed on the same semiconductor substrate and configured to receive a third light input signal directly from the third semiconductor light source, wherein the third light input signal is a coherent signal which can be selectively turned on and off.

4. The optical logic circuit of claim 3, wherein the Boolean logic output is a NOT AND (NAND) function.

5. The optical logic circuit of claim 4, having a multiplicity of optical pathways and interference regions configured to function as an optical processor, wherein the optical processor comprises NOT (inverter) gates and NOT AND (NAND) gates.

6. The optical logic circuit of claim 3, wherein the interference region is configured to cause substantial cancellation of light exiting the interference region through the optical output when the second light input signal is provided to the interference region through the second optical input and the third light input signal is provided to the interference region through the third optical input.

7. The optical logic circuit of claim 1, wherein the Boolean logic output is a NOT (inverter) function.

8. The optical logic circuit of claim 1, wherein the integrated circuit processing techniques include at least one of photoresist techniques, etching techniques and deposition techniques.

9. The optical logic circuit of claim 1, further comprising:
an electromagnetic detector formed on the semiconductor substrate and coupled to the optical output of the interference region and configured to convert the output light signal into an electrical signal.

10. An optical logic gate performing an inversion function for an optical processor, comprising:
a semiconductor substrate comprises a first semiconductor material;
a patterned optical layer overlaying the semiconductor substrate, wherein the patterned optical layer is formed using integrated circuit processing techniques, the optical layer comprising a second semiconductor material, the patterned optical layer comprising an interference region coupled to a first optical conduit and a second optical conduit formed of the second semiconductor material, the first optical conduit coupled to a first semiconductor light source and configured to receive a first light input signal directly from the first semiconductor light source formed on the same semiconductor substrate, and the second optical conduit coupled to a second semiconductor light source and configured to receive a second light input signal directly from the second semiconductor light source formed on the same semiconductor substrate, wherein the first light input signal is a constant coherent light and the second light input signal is a coherent light that may be selectively turned on and off, wherein the first and second semiconductor light sources are formed using integrated circuit processing techniques; and
the interference region coupled to the first optical conduit and configured to receive the first light input signal from the first optical conduit, the interference region coupled to the second optical conduit and configured to receive the second light input signal from the second optical conduit, a predetermined axis in the interference region along which maximum interference of the first and second optical input signals in the interference region occurs, the interference region is coupled to a third optical conduit configured to provide an optical output signal, wherein the third optical conduit is configured to align with the predetermined axis, the maximum destructive interference being caused exclusively by the interaction between first and second light input signals, wherein the interference region is formed of the second semiconductor material and bounded on all sides by semiconductor material other than the second semiconductor material except where the first, second and third optical conduits are coupled to the interference region, wherein the interference region is a uniform three dimensional region and contains no potential barriers partitioning the interference region between the first and second optical conduits and the third optical conduit, wherein the optical output signal is a Boolean logic output signal based on the second light input signal that may selectively be turned on and off, the output signal having one of two intensities, either a substantially on or a substantially off intensity.

11. The optical logic gate of claim 10, wherein the optical logic gate provides a Boolean NOT function as output.

12. The optical logic gate of claim 10, further comprising:
a fourth optical conduit coupled to the interference region and configured to receive a third light input signal directly from a third semiconductor light source formed on the semiconductor substrate.

13. The optical logic gate of claim 12, wherein the optical logic gate provides a Boolean NOT AND (NAND) function as output.

14. The optical logic gate of claim 10, wherein the first semiconductor material comprises at least one of silicon (Si) and Gallium Arsenide (GaAs).

15. The optical logic gate of claim 10, wherein the second semiconductor material comprises doped semiconductor material.

16. The optical logic gate of claim 10, further comprising:
an electromagnetic detector formed on the semiconductor substrate and coupled to the third optical conduit and configured to convert the optical output signal into an electrical signals.

17. The optical logic gate of claim 10, wherein the first semiconductor light source and the second semiconductor light source are Laser diodes.

18. The optical logic gate of claim 10, wherein first semiconductor light source and the second semiconductor light source are semiconductor diodes.

19. An optical logic circuit performing an inversion function, comprising:
a semiconductor substrate comprising a first semiconductor material;
a first semiconductor light source formed on the semiconductor substrate using integrated circuit processing techniques;
a second semiconductor light source formed on the semiconductor substrate using integrated circuit processing techniques;
an optical layer overlaying the semiconductor substrate, the optical layer comprising a second semiconductor material, the optical layer configured to provide a plurality of optical pathways, wherein the optical pathways are formed using integrated circuit processing techniques, the optical pathways forming an optical logic gate, the optical logic gate comprising:
a first optical input pathway coupled to the first semiconductor light source formed on the same semiconductor substrate and configured to receive a first light input signal directly from the first semiconductor light source,
a second optical input pathway coupled to the second semiconductor light source formed on the same semiconductor substrate and configured to receive a second light input signal directly from the second semiconductor light source, wherein the first light input signal and the second light input signal are coherent signals which may be selectively turned on and off, wherein the first and second optical input pathways are in parallel,
an interference region coupled to the first and second optical input pathways and configured to receive the first light input signal from the first optical input pathway and the second light input signal from the second optical input pathway, and
a first optical output pathway coupled to the interference region opposite the first and second optical input pathways;

wherein the interference region comprises the second semiconductor material and is bounded on all sides by semiconductor material other than the second semiconductor material except where the first and second optical input pathways and first optical output pathways are coupled to the interference region, wherein the interference region is a uniform three dimensional region and contains no potential barriers partitioning the interference region between the first and second optical input pathways and the first optical output pathway, the first and second optical input pathways are spaced apart and the first optical output pathway is positioned along a chosen line, along which maximum destructive interference occurs when the first and second light input signals are both on, the maximum destructive interference being caused exclusively by the interaction between first and second light input signals, wherein an output light signal is a first Boolean logic output signal having a logic low when the first and second light input signals are both on, and a logic high when only one of the light input signals is on, wherein the output logic signal is the logic low when the output light signal has a substantially off intensity and the output logic signal is the logic high when the output light signal has a substantially on intensity.

20. The optical logic circuit of claim 19, wherein the first and the second light input signals are selectively turned on and off, wherein the first Boolean logic output is an XOR (exclusive OR) function.

21. The optical logic circuit of claim 19, wherein the first light input signal stays on constantly and the second light input signal is selectively turned on and off, wherein the first Boolean logic output is a NOT (inverter) function.

22. The optical logic circuit of claim 19, further comprising:
a third semiconductor light source formed on the semiconductor substrate using integrated circuit processing techniques, wherein the optical layer further comprises a third optical input pathway coupled to the interference region and to the third semiconductor light source formed on the same semiconductor substrate, the third optical input pathway being configured to receive a third light input signal directly from the third semiconductor light source, wherein the third light input signal is a constant coherent signal, wherein the first Boolean logic output is a NOT AND (NAND) function.

23. The optical logic circuit of claim 22, wherein the interference region is a first interference region and the optical output pathway is a first optical output pathway, the optical logic circuit further comprising:
a second interference region coupled to the first interference region via the first optical output pathway and configured to receive the output light signal as a fourth light input signal that can be selectively turned on and off based on the interference of the first, second and third light input signals in the first interference region;
a fourth optical input pathway coupled to a fourth semiconductor light source formed on the same semiconductor substrate and configured to receive a fifth light input signal directly from the fourth semiconductor light source, wherein the fifth light input signal is a constant coherent signal, wherein the second interference region is coupled to the fourth optical input pathway and configured to receive the fifth light input signal from the fourth optical input pathway;
a second optical output pathway coupled to the second interference region opposite the first output optical pathway and fourth optical input pathway;

wherein the second interference region comprises the second semiconductor material and is bounded on all sides by semiconductor material other than the second semiconductor material except where the first optical output pathway, the fourth optical input pathway and the second optical output pathway are coupled to the second interference region, wherein the second interference region is a uniform three dimensional region and contains no potential barriers partitioning the second interference region between the first optical output pathway, the fourth optical input pathway and the second optical output pathway, the first optical output pathway and the fourth optical input pathway are spaced apart and the second optical output pathway is positioned along a chosen line, along which maximum destructive interference occurs when the fourth and fifth light input signals are both on, the maximum destructive interference being caused exclusively by the interaction between fourth and fifth light input signals, wherein a second output light signal is a second Boolean logic output signal having a logic low when the fourth light input signal is on, and a logic high fourth light input signal is off, wherein the Boolean logic output of the optical logic circuit is an AND function.

24. The optical logic circuit of claim 23, wherein the third semiconductor light source and the fourth semiconductor light source are the same light source.

25. The optical logic circuit of claim 19, wherein the first and second light sources are semiconductor lasers comprising $Al_xGa_{1-x}As_ySb_{1-y}$.

26. The optical logic circuit of claim 19, wherein the first and second light sources are semiconductor lasers comprising $Al_xGa_{1-x}As_ySb_{1-y}$.

27. The optical logic circuit of claim 19, wherein the second semiconductor material is doped semiconductor material.

28. The optical logic circuit of claim 19, further comprising:
an electromagnetic detector formed on the semiconductor substrate and coupled to the first optical output pathway and configured to convert the first output light signal into an electrical signal.

29. A method of forming an optical logic circuit configured to perform an inversion function, comprising:
providing a semiconductor substrate, wherein the substrate is a first semiconductor material;
depositing a second semiconductor material above the semiconductor substrate to form an optical layer;
etching the optical layer in accordance with a pattern to form a plurality of optical pathways, the plurality of optical pathways forming an optical logic gate, the optical logic gate comprising an interference region, a first optical input pathway coupled to the interference region and configured to receive a first light input signal directly from a first semiconductor light source, a second optical input pathway coupled to the interference region and configured to receive a second light input signal directly from a second semiconductor light source, an optical output pathway coupled to the interference region opposite the first and second optical input pathways, wherein the interference region is configured to receive the first light input signal from the first optical input pathway and the second light input signal from the second optical input pathway, wherein the first and second optical input pathways are in parallel, wherein the interference region is a uniform three dimensional region and contains no potential barriers partitioning the interference region between the first and second optical input pathways and the optical output pathway, wherein the first and second optical input pathways are spaced apart and the optical output pathway is positioned along a chosen line, along which maximum destructive interference occurs when the first and second light input signals are provided, the maximum destructive interference being caused exclusively by the interaction between the first and second light input signals, wherein an output light signal is a Boolean logic output signal based on the first and second light input signals, the output light signal exits the interference region at the optical output pathway, the output light signal having one of two intensities, either a substantially on or a substantially off intensity; and depositing a third semiconductor layer above the etched optical layer and the substrate, wherein the third semiconductor layer is a non-translucent semiconductor layer.

30. The method of claim 29, wherein the first and second semiconductor light sources are formed on the same semiconductor substrate as the optical logic gate.

31. The method of claim 30, wherein the optical layer of the logic gate also forms the junction layer of the first and second semiconductor light sources.

32. The method of claim 31, wherein the junction layer of the first and second semiconductor light sources is etched in accordance with the pattern to coupled to the first and second optical input pathways, respectively.

* * * * *

UNITED STATES PATENT AND TRADEMARK OFFICE
CERTIFICATE OF CORRECTION

| | | |
|---|---|---|
| PATENT NO. | : 7,554,707 B1 | Page 1 of 1 |
| APPLICATION NO. | : 09/630883 | |
| DATED | : June 30, 2009 | |
| INVENTOR(S) | : Khosrow Golshan | |

It is certified that error appears in the above-identified patent and that said Letters Patent is hereby corrected as shown below:

Claim 16:
Column 10, line 23, replace "signals" with --signal--.

Claim 26:
Column 12, line 33, replace "$Al_xGa_{1-x}As_ySb_{1-y}$" with --$Ga_xIn_{1-x}As_yP_{1-y}$--.

Claim 32:
Column 14, line 13, replace "to coupled to" with --and coupled to--.

Signed and Sealed this

Seventeenth Day of May, 2011

David J. Kappos
*Director of the United States Patent and Trademark Office*